(12) United States Patent
Fernandes et al.

(10) Patent No.: US 9,590,260 B2
(45) Date of Patent: *Mar. 7, 2017

(54) INTEGRAL REACTOR SYSTEM AND METHOD FOR FUEL CELLS

(71) Applicant: ACUMENTRICS SOFC CORPORATION, Walpole, MA (US)

(72) Inventors: Neil Edward Fernandes, Cambridge, MA (US); Michael S. Brown, Somerville, MA (US); Praveen Cheekatamaria, Norwood, MA (US); Thomas Deng, Needham, MA (US); James Dimitrakopoulos, Peabody, MA (US); Anthony F. Litka, Hanover, MA (US)

(73) Assignee: ACUMENTRICS SOFC CORPORATION, Westwood, MA (US)

( * ) Notice: Subject to any disclaimer, the term of this patent is extended or adjusted under 35 U.S.C. 154(b) by 531 days.

This patent is subject to a terminal disclaimer.

(21) Appl. No.: 14/077,728

(22) Filed: Nov. 12, 2013

(65) Prior Publication Data

US 2014/0120437 A1     May 1, 2014

Related U.S. Application Data

(63) Continuation of application No. 12/949,248, filed on Nov. 18, 2010, now Pat. No. 8,586,252.

(51) Int. Cl.
*H01M 8/04* (2016.01)
*H01M 8/06* (2016.01)
*H01M 8/12* (2016.01)

(52) U.S. Cl.
CPC ..... *H01M 8/0618* (2013.01); *H01M 8/04097* (2013.01); *H01M 2008/1293* (2013.01);
(Continued)

(58) Field of Classification Search
CPC ........... H01M 8/0618; H01M 8/04097; H01M 2008/1293; Y02P 70/56; Y02E 60/525; Y02E 60/50
See application file for complete search history.

(56) References Cited

U.S. PATENT DOCUMENTS

| | | |
|---|---|---|
| 4,374,184 A | 2/1983 | Somers et al. |
| 4,728,584 A | 3/1988 | Isenberg |

(Continued)

FOREIGN PATENT DOCUMENTS

WO     WO 2008/131051     10/2008

OTHER PUBLICATIONS

Susumu Nagata, Akihiko Momma, Tohru Kato, Yasuhiro Kasuga, "Numerical analysis of output characteristics of tubular SOFC with internal reformer", Journal of Power Sources 101 (2001) pp. 60-71, www.elsevier.com/locate/jpowsour.

*Primary Examiner* — Muhammad Siddiquee
(74) *Attorney, Agent, or Firm* — Preti Flaherty Beliveau & Pachios LLP

(57) ABSTRACT

A reactor system is integrated internally within an anode-side cavity of a fuel cell. The reactor system is configured to convert higher hydrocarbons to smaller species while mitigating the lower production of solid carbon. The reactor system may incorporate one or more of a pre-reforming section, an anode exhaust gas recirculation device, and a reforming section.

16 Claims, 4 Drawing Sheets

(52) U.S. Cl.
CPC ............. *Y02E 60/50* (2013.01); *Y02E 60/525* (2013.01); *Y02P 70/56* (2015.11)

(56) References Cited

U.S. PATENT DOCUMENTS

| | | | |
|---|---|---|---|
| 4,788,110 A * | 11/1988 | Bernard | H01M 8/0625 |
| | | | 429/425 |
| 4,983,471 A | 1/1991 | Reichner et al. | |
| 4,984,471 A | 1/1991 | Storer | |
| 5,047,299 A | 9/1991 | Shockling | |
| 5,143,800 A | 9/1992 | George et al. | |
| 5,169,730 A | 12/1992 | Reichner et al. | |
| 5,486,428 A | 1/1996 | Gardner et al. | |
| 5,733,675 A * | 3/1998 | Dederer | H01M 8/02 |
| | | | 429/416 |
| 6,299,994 B1 | 10/2001 | Towler et al. | |
| 6,492,048 B1 * | 12/2002 | Draper | H01M 8/0625 |
| | | | 429/423 |
| 6,572,996 B1 * | 6/2003 | Isenberg | H01M 8/0625 |
| | | | 429/422 |
| 6,610,434 B1 | 8/2003 | Draper et al. | |
| 6,655,130 B1 | 12/2003 | Kirwan et al. | |
| 6,800,390 B2 | 10/2004 | Kashiwagi | |
| 6,926,979 B2 | 8/2005 | Cao | |
| 7,267,900 B2 | 9/2007 | Lee | |
| 7,291,416 B2 | 11/2007 | Margiott et al. | |
| 7,320,840 B2 | 1/2008 | Pechtold et al. | |
| 7,338,727 B2 | 3/2008 | Chen et al. | |
| 7,377,111 B2 | 5/2008 | Agnew | |
| 7,384,702 B2 | 6/2008 | Goebel | |
| 7,387,850 B2 | 6/2008 | Bourgeois | |
| 7,422,810 B2 | 9/2008 | Venkataraman et al. | |
| 7,516,609 B2 | 4/2009 | Agnew | |
| 7,524,572 B2 | 4/2009 | Venkataraman et al. | |
| 7,553,568 B2 | 6/2009 | Keefer | |
| 7,638,218 B2 | 12/2009 | Yoshida et al. | |
| 7,704,617 B2 | 4/2010 | Venkataraman | |
| 8,586,252 B2 | 11/2013 | Fernandes et al. | |
| 2002/0136942 A1 | 9/2002 | Kashiwagi | |
| 2004/0081869 A1 | 4/2004 | Morishima et al. | |
| 2006/0134470 A1 * | 6/2006 | Kaye | H01M 8/04037 |
| | | | 429/415 |
| 2007/0160890 A1 | 7/2007 | Fischer | |
| 2007/0231659 A1 | 10/2007 | Ma et al. | |
| 2008/0124590 A1 * | 5/2008 | Ballantine | H01M 8/04089 |
| | | | 429/432 |

* cited by examiner

US 9,590,260 B2

INTEGRAL REACTOR SYSTEM AND METHOD FOR FUEL CELLS

STATEMENT REGARDING FEDERALLY SPONSORED RESEARCH OR DEVELOPMENT

This invention was made under Department of Energy Contract No. DE-FC36-03NT41838. The Federal Government has certain rights to this invention.

CROSS REFERENCE TO RELATED APPLICATIONS

This application claims the benefit under 35 U.S.C. §120 of U.S. application Ser. No. 12/949,248, filed Nov. 18, 2010, the entire disclosure of which is incorporated herein by reference.

BACKGROUND OF THE INVENTION

Solid oxide fuel cells (SOFCs) generate electricity through the spontaneous transport of an oxygen ion across a strong chemical potential gradient. The chemical potential gradient for oxygen is maintained by the renewal of air on the cathode side, and the replenishment of fuel on the anode side. While there has been much interest in the use of hydrogen as the fuel, hydrocarbon fuels are still the most practical as they have the highest energy density and commercial availability.

SOFCs operate at high temperatures. Hydrocarbon fuels, however, have a propensity to coke, or form carbon deposits, at high temperatures, whether by gas phase pyrolysis or through heterogeneous catalytic routes. To avoid carbon formation, the fuel is prepared by reforming it to more refractory molecules such as methane, carbon monoxide and hydrogen, as well as by removing the thermodynamic driving force for solid carbon. Carbon activity, which is the thermodynamic propensity for carbon formation, is particularly sensitive to the presence of oxygen, and as such, for high temperature fuel cells, it is generally advisable to maintain an oxygen atom to carbon atom ratio of approximately 1:1 to 2:1 in the fuel entering the fuel cell. Mitigation of carbon deposition in high temperature fuel cells can be achieved by lowering of the carbon activity through the addition of an oxidant in the fuel stream, typically either air or water.

Reformers for fuel cells have been developed that are located external to the fuel cell. External steam reformers are generally large and complex and require a separate source of water. Some external reformers utilize oxygen present in the hot anode exhaust as carbon dioxide and water. For example, the hot anode exhaust is collected in a manifold outside the fuel cell stack and recirculated by high temperature blowers or ejectors back into the fuel cells. Ejector systems have a more simple design compared to hot gas blower systems, although their efficiency falls off rapidly as the pressure ratio increases (or orifice size decreases), and high pressure (~100 psi) is required to generate the high suctions necessary for overcoming the pressure head of the stack.

SUMMARY OF THE INVENTION

An integral reactor system and method are provided for preparing and distributing fuel in a fuel cell. The system offers the advantages of obviating carbon formation, a method for distributing fuel and mitigating hotspots, and increasing efficiency though reducing the need for adding oxygen in some form to the feed to prepare it for the fuel cell. In particular, a fuel delivery element is disposed in each individual fuel cell, containing at least a recirculation device, such as an orifice. The fuel delivery element also may contain a pre-reforming section upstream of the recirculation device and reforming section downstream of the recirculation device. This reactor section terminology describes the relative positions of fuel reforming sections to the internal recirculation device and does not necessarily imply a specific type of reaction in any particular section.

More particularly, a reactor system for a fuel cell having an anode-side cavity comprises a fuel delivery element comprising one or more walls forming a fuel passage, a fuel inlet at one end of the fuel passage, and a fuel outlet at an opposite end of the fuel passage. The fuel delivery element is configured to deliver fuel through the fuel outlet into the cavity of the fuel cell and to induce recirculation of partially utilized anode gas within the cavity and/or into the fuel passage. The fuel delivery element may include a reactor configured to convert a higher hydrocarbon to a smaller thermally stable species, such as methane, hydrogen, and carbon monoxide, while mitigating the production of solid carbon. The fuel delivery element may include a reforming section and/or a pre-reforming section configured to reform a hydrocarbon fuel to a smaller species in the presence of an oxidant. The fuel delivery element may include an anode exhaust gas recirculation device configured to cause recirculation of oxygen-rich anode exhaust gas formed in the anode-side cavity of the fuel cell through a length of the fuel delivery passage of the fuel delivery element. The pre-reforming section, if present, may be disposed upstream of the anode exhaust gas recirculation device, and the reforming section, if present, may be disposed downstream of the anode exhaust gas recirculation device.

The anode exhaust gas recirculation device may comprise a constriction in the one or more walls forming the fuel passage of the fuel delivery element and one or more suction bores downstream of the constriction, the suction bores open to the anode-side cavity of the fuel cell. In this manner, anode exhaust gas is drawn into the fuel delivery device through the suction bores by suction created by the high velocity jet issuing from the constriction, and fuel is reformed in the presence of the anode exhaust gas within the reforming section of the fuel delivery device. A partition may be disposed across the fuel passage in the fuel delivery element, the constriction comprising an orifice in the partition. The constriction may comprise a venturi shape formed in the one or more walls of the fuel delivery element. The constriction may comprise a venturi or orifice at the outlet of the fuel delivery element.

The inclusion of all of these sections is not necessarily needed in every fuel cell or fuel cell system. Also, the anode gas recirculation device may exist at the end of the fuel delivery element. In this case the recirculation device creates recirculation zones or eddies within the anode cavity at the exit of the fuel delivery element, mixing the ejected fuel with anode gas which has been at least partially electrochemically oxidized and thus contains a level of oxidant to avoid solid carbon formation.

The reforming and/or pre-reforming section may comprise one or more catalyst materials coated on an interior or exterior surface of one or more walls of the fuel delivery element. The catalyst concentration may be graded along the length of the fuel delivery tube in either section, to optimize the reforming reactions while avoiding solid carbon formation. The catalyst materials may be comprised of formulations of zirconia, rare earth oxides such as ceria, alumina, nickel, platinum, rhodium, ruthenium, palladium, or cobalt. The fuel delivery element may be coated with a passivating material configured to minimize solid carbon nucleation.

The reactor system is disposed within the anode-side cavity of a fuel cell of a fuel cell system. The fuel cell may be a solid oxide fuel cell and may have a tubular form. A plurality of fuel cells may be arranged in a fuel cell stack, each fuel cell incorporating an integral reactor system. A downstream section of each reactor system may be in thermal communication with the fuel cell, whereby heat for reformation reactions in the reactor system is supplied by the fuel cell. The fuel cell system may be configured to have a temperature gradient along the fuel cell. An upstream section of the reactor system may be in thermal communication with a chamber external of the fuel cell, such as an anode exhaust chamber or a coolant chamber supplied with a coolant fluid. The coolant fluid may comprise air or a fuel or another fluid medium introduced specifically for cooling. The fuel cell system may be separated into zones of different temperatures, by for example, an insulating material, to control the inlet temperature. A supplemental oxidant feed may be provided to the fuel inlet of the reactor system, for example, for use during start up or periods of low flow momentum, or when a certain degree of pre-reforming or selective oxidation is required in order to further lower the propensity of solid carbon formation. An oxygen partial pressure sensor may be disposed within the fuel cell or reactor system for measuring oxygen partial pressure for metering oxidant flow.

DESCRIPTION OF THE DRAWINGS

The invention will be more fully understood by reference to the following detailed description when considered in conjunction with the accompanying drawings, in which.

DETAILED DESCRIPTION OF THE INVENTION

The disclosure of U.S. application Ser. No. 12/949,248 filed on Nov. 18, 2010, is incorporated by referenced herein.

An integral reactor system for a fuel cell system, and in particular a solid oxide fuel cell (SOFC) system, is provided that incorporates one or more of reforming and pre-reforming of a hydrocarbon fuel and anode exhaust gas recirculation, in conjunction with the delivery of fuel to the anode side of the fuel cell. The reactor system is located internally within the fuel cell and is particularly suited for tubular style electrolyte supported or anode supported high temperature fuel cells. The reactor system is applicable to any fuel cell in which the anode, i.e., the oxidizing or fuel electrode, is on the inside of the cell. Although described and shown herein in conjunction with a tubular fuel cell, the reactor system can be employed with other fuel cell configurations, such as a planar fuel cell, in which a plurality of reactor systems could be employed.

Figure 1:
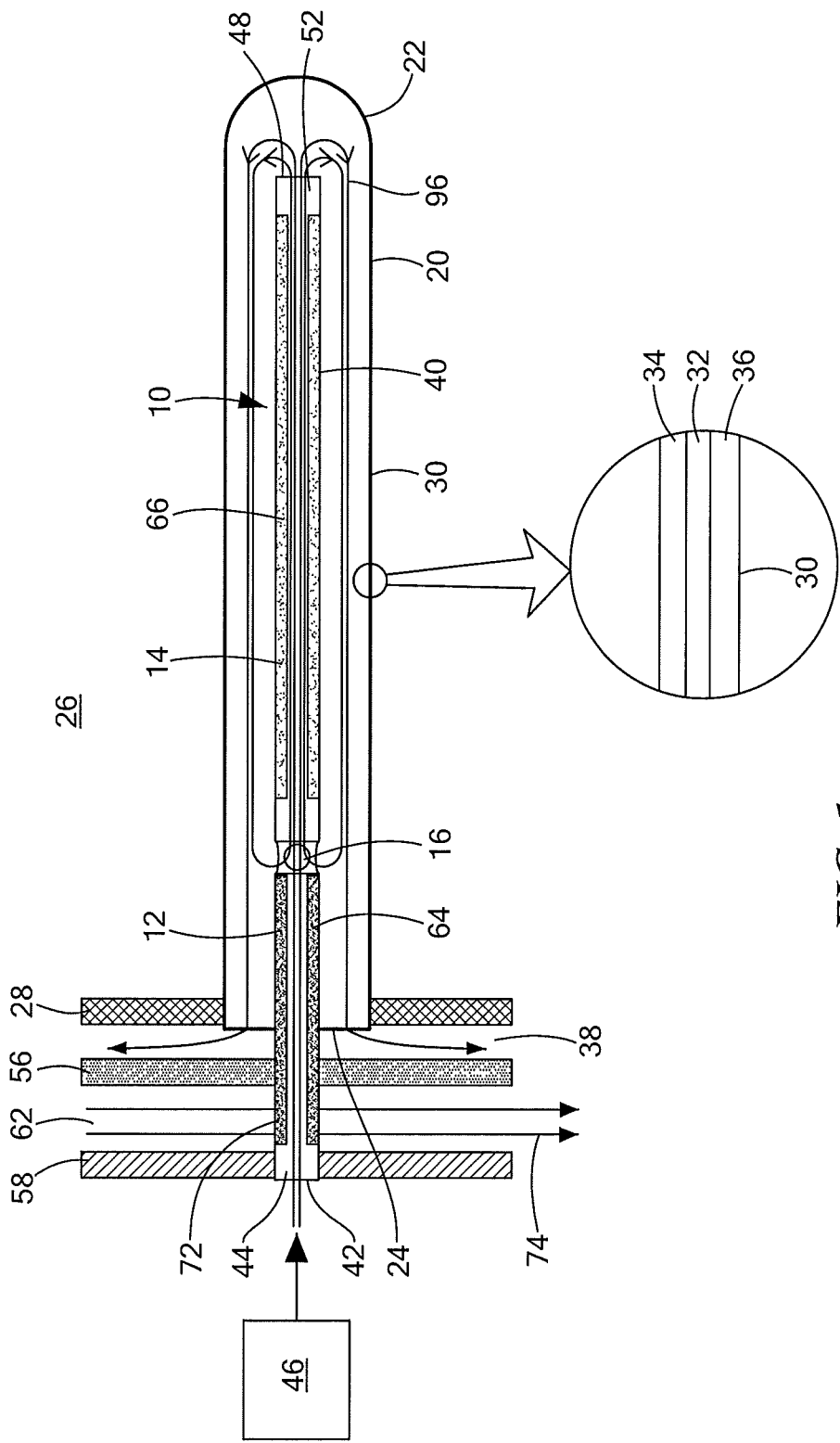
FIG. 1 is a cross-sectional view of an axisymmetric integral reactor system in conjunction with a tubular solid oxide fuel cell.

An exemplary embodiment of an integral reactor system 10 is illustrated schematically in FIG. 1 in conjunction with a tubular solid oxide fuel cell 20. The reactor system incorporates one or more of a pre-reforming section 12, a reforming section 14, and an anode exhaust gas recirculation device 16, described further below. The tubular fuel cell may be constructed and operated as known in the art. For example, the fuel cell is closed at one end 22 and open at another end 24. The fuel cell is supported within a generator chamber 26, for example, by supporting the open end in a tube sheet 28, which may form a wall of the chamber. Generally, a plurality of fuel cells are provided within the chamber, arranged in an array and supported by the support structure; for clarity, only one fuel cell and one integral reactor system are illustrated. Also for clarity, current collectors and other electrical connections to the fuel cell are not shown in FIG. 1.

The tubular fuel cell wall 30 includes an electrolyte layer 32 sandwiched between two electrodes 34, 36, as known in the art. The innermost electrode 34 is a fuel electrode, or anode. The outermost electrode 36 is an oxidant electrode, or cathode. In operation, an oxygen source, generally air, is introduced through a suitable inlet port (not shown) into the generator chamber surrounding the fuel cells, for reaction at the cathode layer. Spent oxidant is exhausted outside the chamber through a suitable outlet port (not shown). Oxygen ions are transported through the electrolyte to react with the fuel to form $H_2O$ and $CO_2$. Electrons, released from the reacted fuel at the anode, are harnessed for power generation or another purpose. The anode exhaust gas containing $H_2O$ and $CO_2$ and unused $H_2$ and $CO$ is discharged through the open end 24 of the fuel cell 20 to an anode exhaust compartment 38.

A variety of fuels can be used in the fuel cell. Hydrocarbon fuels can be generally represented by the formula $C_xH_y$, although additional impurities, such as oxygen, sulfur, nitrogen, or the like, can be present. Examples include, but are not limited to, saturated and unsaturated hydrocarbons, aliphatics, alicyclics, aromatics, and mixtures thereof. Further examples include, but are not limited to, gasoline, diesel, jet propulsion fuels (such as JP8), kerosene, hydrocarbon fuels having the formula $C_nH_{2n+2}$, (such as methane ($CH_4$), propane ($C_3H_8$), or butane ($C_4H_{10}$)), natural gas, liquid petroleum gas, gasified fuels, biofuels, and mixtures thereof. Examples of oxygen-containing hydrocarbon fuels include, but are not limited to, alcohols, such as $C_1$-$C_{20}$ alcohols and combinations thereof, such as methanol, ethanol, propanol, butanol, and mixtures thereof.

The integral reactor system 10 includes a fuel delivery element, generally in the form of a tube 40, open on both ends 42, 48, disposed within the tubular fuel cell 20. The tube 40 can be formed from a metallic material, such as high temperature stainless steel or nickel alloys, or a ceramic material, such as alumina or zirconia. One end 42 forms a fuel inlet 44, in communication with a fuel source 46. The fuel may be further pressurized when supplied to the inlet, and suitable equipment, such as pumps, flow controllers, plenums, and conduits, are utilized as needed. Another end 48 of the tube 40 forms a fuel outlet 52. In this embodiment, the tube 40 extends substantially along the length of the fuel cell 20, and the fuel outlet 52 is located near the closed end 22 of the fuel cell 20. In operation, fuel from the source 46 is introduced into the tube 40 through the inlet 44 and exits the tube 40 at the outlet 52. The fuel flows back along the fuel cell 20 for electrochemical reaction at the anode 34.

The tube 40 is preferably circular in cross-section, although any cross-sectional configuration can be used, such as oval, square, etc. The fuel delivery tube may be supported at the inlet end 42 by a tube sheet or other suitable support structure. The tube sheet may form, for example, a wall 56 of the anode exhaust compartment 38 or a wall 58 of another compartment, such as a chamber 62 for coolant flow, discussed further below.

The length of the tube 40 and reforming sections may be different for different fuels. In one extreme embodiment, for fuels less prone to thermal decomposition, such as methane, the length of the reforming sections may be zero, and thus the integral reactor would comprise the tube 40 and the recirculation device 16, such as merely an orifice located to sufficiently eject the fuel through the outlet 52. The length of tube 40 would be judiciously chosen based on the current density in the fuel cell, such that fluid recirculation zones created at the exit of the tube 40, but inside the anode compartment, entrain as much of the desirable oxidants from the partially used fuel. It would thus generate a gas mixture rich in water, hydrogen, carbon monoxide and carbon dioxide, which would have less propensity to form solid carbon and which can continue to reform homogeneously or heterogeneously in the anode compartment.

As noted above, the integral reactor system 10 includes one or more of a pre-reforming section 12, a reforming section 14, and an anode exhaust gas recirculation device 16. The anode exhaust gas recirculation device is suitably disposed along the tube 40 at a location to induce recirculation of a portion of the anode exhaust gas back into the tube. The pre-reformer section 12 is formed along an upstream portion of the tube 40. In this section, a suitable pre-reforming catalytic material(s) 64 (for example, for higher hydrocarbon fuels) is coated onto the interior wall of the fuel delivery tube 40 on the high pressure side of the recirculation device 16 (if present). The reformer section 14 is formed along a downstream portion of the tube 40. In this section a reforming catalytic material(s) 66 is coated onto the interior wall of the fuel delivery tube 40 on the low pressure side of the recirculation device (if present). The reformer further converts the fuel (or pre-reformed fuel), and can make use of the oxygenated components of the induced anode exhaust recirculation (if present) and the high temperature and waste heat of the cell.

The catalytic material(s) may be coated onto the interior or exterior surface(s) of the reformer section and/or pre-reformer section using any suitable technique, such as a standard wash or slip coating or spray coating. The catalytic material may be, for example, but not limited to, formulations of rhodium, nickel, ruthenium, palladium, platinum, molybdenum, vanadium, or cobalt, with rare earth oxides such as ceria, alumina, and zirconia. The surface of the tube may also be coated with a dense or partially dense passivating material from formulations of rare earths such as ceria, alumina, or zirconia to prevent or minimize solid carbon nucleation. It is possible that a coating is not needed for operations in the event the tube materials and manufacture are carefully chosen to naturally incorporate the desired catalytic activity.

Internal reforming (reforming within the fuel cell) increases efficiency over external reforming (reforming outside of the fuel cell stack) and provides a more compact structure. Reforming of hydrocarbon fuels, such as natural or liquid petroleum gas, and the liquid fuels, such as JP8 and diesel fuels, requires high temperatures, greater than 500° C. Thus, internal reforming is practical in a fuel cell that operates at a high temperature, such as a solid oxide fuel cell (SOFC).

Pre-reforming of higher hydrocarbons to smaller species less susceptible to uncontrollable pyrolysis is also desirable, but must generally be effected at lower temperatures. Thus, the pre-reformer 12 may be integrated into the higher pressure side of the tube 40, upstream of the recirculation device 16, where the fuel mixture first enters the integral reactor system. The temperature of the pre-reforming section can be controlled in one or more ways. In one embodiment, the fuel cell stack can be operated under a temperature gradient, for example, with a higher temperature at the closed end 22 and a lower temperature at the open end 24. Such a gradient could be effected by the air flow typically used, for example, to remove heat resulting from the electrochemical reactions. In another embodiment, a portion 72 of the tube 40 of the integral reactor system 10 can be extended outside of the high temperature zone where its temperature can be actively controlled through contact with a coolant 74, such as an air or fuel stream, in the coolant chamber 62, or passively controlled through the use of a thermal insulation block. In yet another embodiment, the thickness and/or material of the pre-reformer section walls can be selected so that the heat flow from the outside is limited.

The reformer section 14 is integrated into the lower pressure side of the tube 40. Its temperature is controlled by the temperature of the fuel cell. The tubing wall and the catalytic coating can be made sufficiently thin to provide minimum resistance to heat transfer, so that the reaction is not heat transfer limited.

Figure 6:
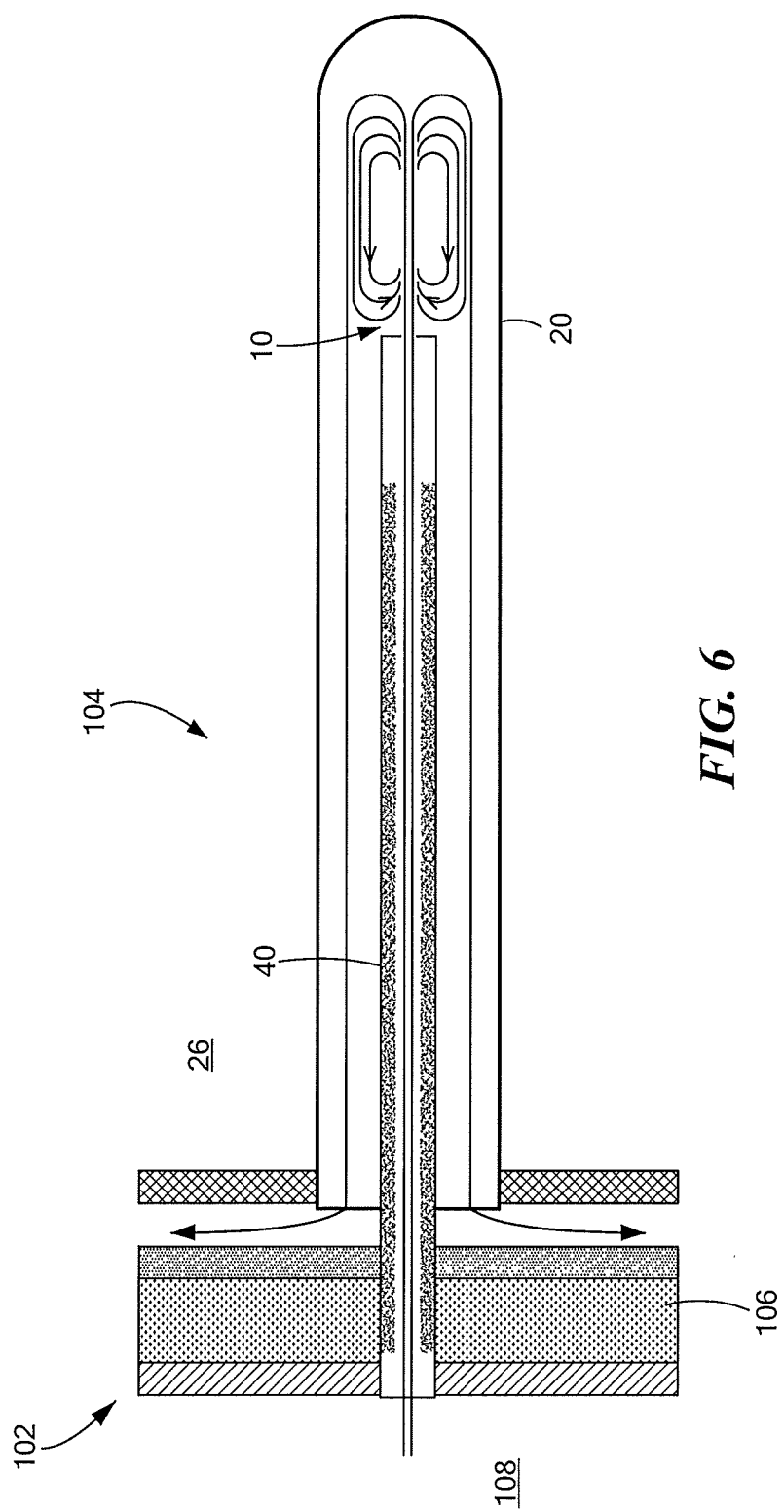
FIG. 6 is an embodiment of an integral reactor system in a fuel cell system incorporating an insulation slab for temperature moderation of the inlet feed and pre-reforming section of the integral reactor.

Referring to FIG. 6, the division of a fuel cell system into separate zones for temperature control is illustrated. The fuel/oxidant mixture must be distributed to the fuel cells 20 within a fuel cell system in such a way that the fuel does not reach a homogeneous ignition condition. That is, temperatures in the fuel cell system are controlled so that reactions only occur in the reactor systems 10 and preferentially over a heterogeneous catalyst phase or surface. In this instance, to control this temperature, the fuel cell system is split into two temperatures zones 102, 104, by an insulating material 106, in the form of, for example, a sheet, slab, or block. Any suitable insulating material may be used. The tube 40 extends through the insulating material 106 from a colder plenum 108 into the fuel cell 20. The thickness of the insulating material is selected so that the temperature of the plenum 108 is cool enough to avoid homogeneous ignition. While the fuel cells operate in a temperature range of, for example, 700 to 800° C., the fuel/oxidant mixture is distributed to the cells at a temperature range of, for example, 50 to 200° C.

Figure 2:
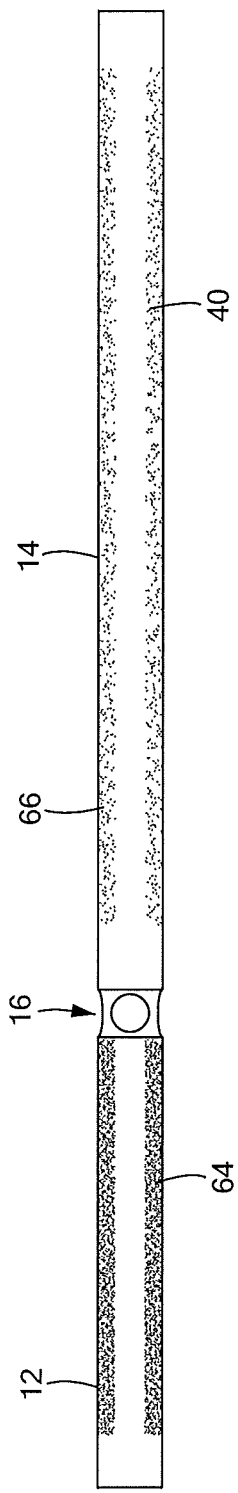
FIG. 2 is a side view of the integral reactor system of FIG. 1.
Figure 3:
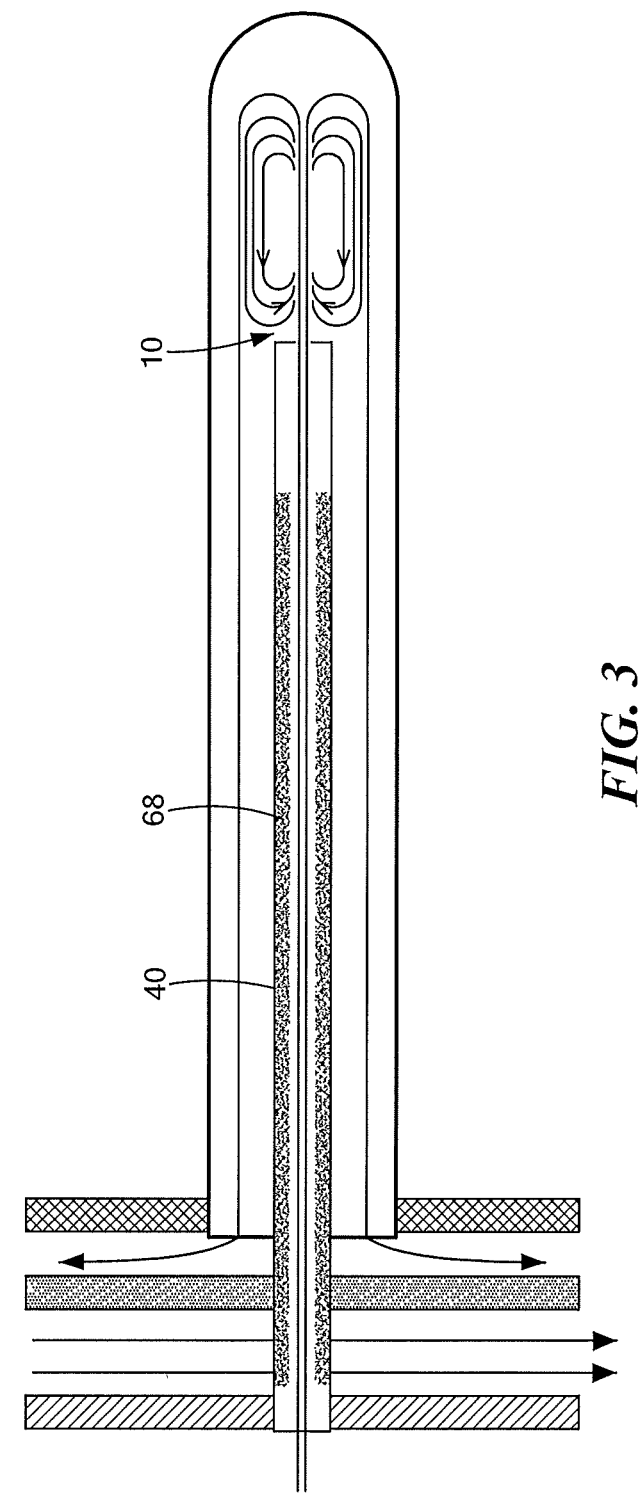
FIG. 3 is a side view of an integral reactor system illustrating no distinction between a pre-reforming section and a reforming section, with the recirculation device located at the end of the integral reactor.
Figure 4:
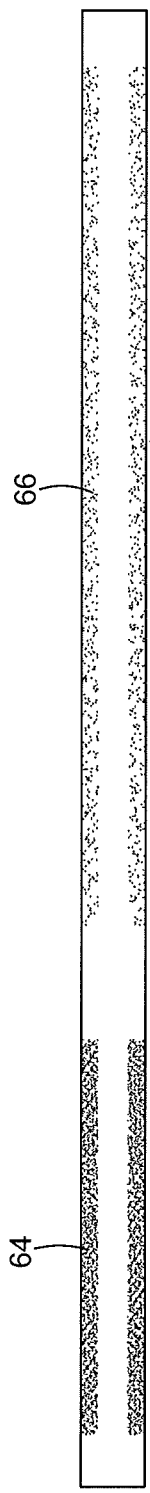
FIG. 4 is a side view of an integral reactor system illustrating a pre-reforming section and a reforming section, with no recirculation device.

A distinction between the pre-reforming catalyst 64 and the reforming catalyst 66 is not always necessary. In the case where a recirculation device 16 is employed, the distinction is clear from the catalyst position relative to the recirculation device. See FIG. 2. If there is no recirculation device, a single continuous coating or coating graded in catalyst concentration and composition 68 on the interior wall of the tube 40 may perform both pre-reforming and reforming. See FIG. 3. Alternatively, two different catalytic coatings 64, 66 may be employed even when there is no recirculation device 16. See FIG. 4. Additionally, the outer or external surface of the tube 40 can be coated with a catalytic material. Also, the catalytic material can be coated only on the outer surface of the tube 40.

Figure 5:
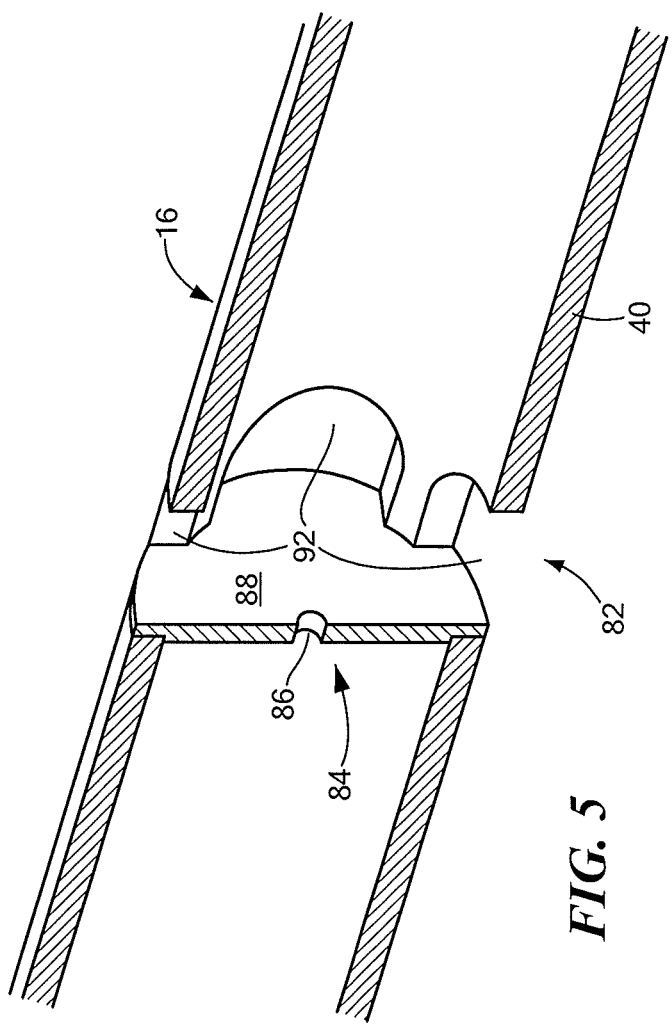
FIG. 5 is a partial sectional view of a recirculation device of the integral reactor system of FIG. 1.

Referring to FIGS. 1 and 5, in one embodiment, the anode exhaust gas recirculation device 16 is provided by an ejector 82 suitably located along the tube 40 to recirculate a portion of the anode exhaust gas back into the tube. The ejector 82 can be formed by a constriction 84 in the tube, such as a pinhole orifice 86 in a partition 80 across the tube 40, a narrowing of the tube wall, or a nozzle within the tube. Downstream of the constriction 84, one or more suction bores 92 are disposed through the wall of the tube 40. The suction bores 92 are nearer to the open end 24 where the anode exhaust exits, and thus the bores are exposed to a gas stream rich in the oxygenated species. Flow of the fuel accelerates through the constriction 84, inducing flow of the exhaust gas through the suction bores 92 and back into the tube 40, indicated schematically by circulation loops 96 in FIG. 1. A venturi shape can also be formed in the tube wall downstream of the constriction to improve the efficiency of recirculation.

Parameters such as the orifice diameter, the shape of the venturi section, injector tube diameter and length, and the cell diameter and length can be selected to achieve the desired induced flow, as would be understood by those of skill in the art. Operating parameters, such as the temperature and the mass flow rate of the ejected gas, similarly can be designed to achieve the desired induced flows, as would be understood by those of skill in the art.

A venturi or orifice can be placed in theory anywhere along the tube 40, including at the tip. Recirculation zones are created naturally as the fuel and/or oxidant mixture (the fuel mixture) is ejected from the tip. The size and shape of the recirculation zones are dependent on gas composition and velocity. The gas composition, in particular, sets the viscosity, density, and diffusion characteristics of the fuel mixture. When the fuel cell is operated, the recirculation zones or eddies entrain oxygenated species from the cell wall, which mix with the emitted fuel mixture, thus forming an oxygen-rich composition field in the zone around the tip. This situation is the limiting case of water recirculation where anode recirculation occurs at highest efficiency. If the system has motive force such as pressure, the system may incorporate a mechanical or other fluidic recirculation device using that motive force.

It is possible to operate at especially low oxygen to carbon (O/C) values as the flow velocity increases. The entrained volume is dependent on the initial momentum of the fuel mixture. The momentum can be increased by the addition of an inert species. For example, for a methane/air mixture at O/C=0.5, nitrogen is a significant component, which, while inert, still increases the momentum of the jet and thus the volume of entrained gas. Thus, instead of using a fuel/air mixture, another gas, preferably heavy, inert or not, may be used, such as, for example, $CO_2$ from a sequestered source. Biogas from an anaerobic digestor in particular is high in $CO_2$ and this mixture would suffice to entrain water even without any added oxidant, leading to especially efficient systems. In the case of natural gas, which may include several components heavier than methane and more likely to thermally crack, the catalyst of the reactor system serves to promote their clean oxidative decomposition with high selectivity. For example, platinum group metal catalysts can promote oxidation or partial oxidation, but not methane decomposition. In steam reforming of natural gas, the water required, typically at least S/C=2 over a nickel catalyst (with an anode of a cermet material), can be reduced close to unity, lessening the burden of water treatment. These gains in efficiency can be achieved by the judicious positioning and sizing of a venturi or orifice within the anode cell.

The integral reactor system is advantageous because the recirculation loop is contained entirely within the fuel cell 20. The required suction and hence motive pressure for anode gas recirculation is minimized by placing the recirculation loop within each individual cell. Flow resistances external to the cell need not be overcome, as with an externally located anode exhaust gas recirculation device. High induced flows can be achieved because the pressure drop is minimized between the constriction and the cell exhaust; otherwise the inlet fuel flow would undesirably exit the suction ports and leave the cell unused. To minimize the pressure of the fuel (the motive gas), the flow resistance within the cell can be further minimized by increasing the diameter of the tube of the integral reactor system. The head loss that must be overcome is reduced by approximately two orders of magnitude, and high recycle ratios can, in principle, be maintained with relatively low pressures drops across the constriction, approximately 1 psig compared with the approximately 100 s or 1000 s of psig required when the recirculation loop is around the entire stack.

Similarly, the present integral reactor system is advantageous, for example, because it is not burdened with external handling of water as the oxygen source, as are prior art external steam reformers. Water has a high heat of vaporization, and its carriage in prior art mobile applications is an additional logistics burden that is avoided by the present system. Moreover, steam reforming of hydrocarbons is endothermic and thus prior art steam reformers are generally large and operate under heat transfer and/or kinetic limitations. The present integral reactor system mitigates such issues.

A further advantage of the present system is that there is no need to collect the anode gas from the entire stack in a common header because the recirculation occurs within the cell or immediately at the exhaust of the cell, in contrast to prior art designs that have been presented for utilizing the anode compartment gas exhaust for reforming. Furthermore since an integral reformer is partnered with each cell, the scaling up of the stack to include more cells does not require any change in design for the integral reformer, as may be required for an external reformer. The compactness and simplicity of the fuel delivery element readily lends the present integral reactor system to scaling to fuel cell systems of any size or complexity. The system can achieve high efficiencies while mitigating the formation of solid carbon. Efficiencies can be enhanced due to the ability of the present system to operate in less thermodynamically favorable regions of H:C:O. The system provides the ability to enhance thermal control of the reactions.

When an SOFC is starting up, a finite time is required to reach the operating temperature and until then the fuel cell is not powered, and thus the oxidant-rich anode exhaust does not yet exist. To bootstrap the fuel cell, an oxidant source may be temporarily required to aid in forming a reducing gas. This may be air, which can be temporarily mixed with the inlet gas to effect a catalytic partial oxidation, either in an external reactor or in the integral reactor.

For fuel cells in which the electrical load is frequently modulated, it is possible that the fuel flow metered for the current load will be too small (i.e., have too low a momentum) to entrain sufficient exhaust for the reforming. In this case, it may be desirable to introduce a second high pressure gas into the reactor system to increase the motive flow, albeit at the expense of increased pressure. For example, pressurized air can be introduced, resulting in autothermal operation in the integral reactor system, i.e., simultaneous reforming of oxygen, fuel and water mixtures. The amount of air, steam, or oxygen required can be controlled through the sensing of the oxygen partial pressure at the reactor system outlet 52 or at the fuel cell outlet 24 using standard electrochemical processes, or by measuring the total gas flow through the constriction, as would be known in the art. For example, an electrochemical oxygen sensor can be integrated onto the fuel cell, but isolated from the power generating electrodes. Such a sensor need only be built onto a single fuel cell in a stack if the flows are well distributed. While the addition of air reduces the overall efficiency from pure steam reforming, the efficiency is increased from that which would arise from pure partial oxidation. The secondary gas could, however, also be an inert gas if available.

Some examples of applications of the present integral reactor system for the reforming of methane, biogas, and liquid fuels are described as follows.

Methane is one of the more stable hydrocarbons and as such needs little or no pre-reforming at the operating temperatures of state of the art SOFCs. In the normal powered condition, methane is metered from a high pressure source (~1-5 psig) into the integral reactor system and its ejection through the constriction entrains sufficient oxidant-rich exhaust to effect reformation and prevent carbon deposition on the anode. No air is added and no energy is used to raise additional steam. Thus, very high efficiencies can be obtained. Moreover, the expense of equipment for water handling, such as purifiers and evaporators, is obviated.

In cases where high pressure is unavailable, natural gas can still be efficiently reformed with a low amount of air (oxygen-to carbon ratio at inlet to fuel delivery tube less than unity) in an integral reformer which includes a pre-reforming section and a recirculation device at the end of the fuel delivery tube. As described previously, fluid recirculation zones are created in the vicinity of the recirculation device, so that the gas mixture actually contacting the anode tube has a protective concentration of carbon dioxide and water.

The integral reactor system can also effect the efficient conversion of biogas sourced, for example, from anaerobic digesters. This fuel is typically methane diluted with carbon dioxide. Both methane and carbon dioxide are thermally stable. Thus, this gas mixture can be ejected using a recirculation device 16 as described above. The addition of an additional motive gas such as air is either unnecessary or minimized, since the $CO_2$ provides the balance of the momentum for sufficient water entrainment. Moreover as the $CO_2$ already carries an "extra" oxygen atom, the recirculation requirement is especially modest.

The integral reactor system can employ liquid fuels that have been converted to a suitable gas in order to provide sufficient motive flow for entrainment. Vaporized liquid fuel can be converted by standard gasification processes such as steam reforming or partial oxidation. Partial oxidation of the vapor, for instance, can be carried out in the pre-reforming section 12 of the tube 40 if a suitable catalyst is coated onto the walls. The addition of a motive gas such as air is useful to boost the motive flow. The resulting effluent ejected through the constriction of the recirculation device 16 entrains sufficient anode exhaust to complete the conversion of the hydrocarbon fuel in the reforming section 14 downstream of the recirculation device. An alternative to air is the use of water (if available) to effect steam pre-reforming. The use of water results in an ancillary stream; however, the water requirements are nevertheless modest, because of the induced anode exhaust recirculation.

The embodiments and applications of the integral reactor presented above are illustrative. The invention is not to be limited by what has been particularly shown and described, except as indicated by the appended claims.

What is claimed is:

1. A fuel cell system comprising:
   a solid oxide fuel cell including an anode-side cavity; and
   a fuel delivery element comprising one or more walls forming a fuel passage, a fuel inlet at one end of the fuel passage, and a fuel outlet at an opposite end of the fuel passage;
   the fuel delivery element configured to deliver fuel through the fuel outlet into the anode-side cavity of the fuel cell and to induce recirculation of partially utilized anode gas within the cavity or into the fuel passage;
   wherein the fuel delivery element comprises an anode exhaust gas recirculation device configured to cause recirculation of at least a portion of an oxygen-rich anode exhaust gas formed in the anode-side cavity of the fuel cell through a length of the fuel delivery passage of the fuel delivery element.

2. The fuel cell system of claim 1, wherein the anode exhaust gas recirculation device comprises a constriction in the one or more walls forming the fuel passage of the fuel delivery element and one or more suction bores downstream of the constriction, the suction bores open to the anode-side cavity of the fuel cell, whereby anode exhaust gas is drawn into the fuel delivery device through the suction bores by suction and fuel is reformed in the presence of the anode exhaust gas within the fuel delivery device.

3. The fuel cell system of claim 2, wherein a partition is disposed across the fuel passage in the fuel delivery element, and the constriction comprises an orifice in the partition.

4. The fuel cell system of claim 2, wherein the constriction comprises a venturi shape formed in the one or more walls of the fuel delivery element.

5. The fuel cell system of claim 1, wherein the anode exhaust gas recirculation device is disposed adjacent the fuel outlet of the fuel delivery device; and
   wherein the anode exhaust gas recirculation device comprises an orifice or a venturi.

6. The fuel cell system of claim 1, wherein a portion of the fuel delivery element comprises an ejector configured to eject fuel into the cavity; and
   wherein the ejector is disposed adjacent the fuel outlet.

7. The fuel cell system of claim 1, wherein the fuel cell is tubular.

8. The fuel cell system of claim 7, wherein the fuel cell is closed at one end and open at an opposite end, the open end comprising an anode exhaust port.

9. The fuel cell system of claim 1, wherein the fuel delivery element is supported by a tube sheet, the tube sheet forming a wall of a coolant chamber.

10. The fuel cell system of claim 9, wherein the tube sheet further includes a block of insulation to aid in controlling the temperature of the coolant chamber or the temperature of the fuel delivery element within the fuel cell.

11. The fuel cell system of claim 1, wherein a downstream section of the fuel delivery element is in thermal communication with the fuel cell.

12. The fuel cell system of claim 1, wherein an upstream section of the fuel delivery element extends outside of the fuel cell and is in thermal communication with a chamber external of the fuel cell.

13. The fuel cell system of claim 12, wherein the external chamber comprises an anode exhaust chamber or a coolant chamber supplied with a coolant fluid; and
   wherein the coolant fluid comprises air or a fuel.

14. The fuel cell system of claim 1, wherein the fuel cell system is configured to have a temperature gradient along the fuel cell.

15. The fuel cell fuel cell system of claim 1, wherein the fuel cell system further includes a supplemental oxidant feed into the fuel inlet.

16. The fuel cell system of claim 1, further comprising an oxygen partial pressure sensor disposed within the fuel cell.

* * * * *